US007685826B2

(12) United States Patent
McCooey et al.

(10) Patent No.: US 7,685,826 B2
(45) Date of Patent: Mar. 30, 2010

(54) METHODS AND APPARATUS FOR PERFORMING ENGINE MAINTENANCE

(75) Inventors: Francis William McCooey, Derry, NH (US); John Joseph Hudak, Peabody, MA (US)

(73) Assignee: General Electric Company, Schenectady, NY (US)

( * ) Notice: Subject to any disclaimer, the term of this patent is extended or adjusted under 35 U.S.C. 154(b) by 801 days.

(21) Appl. No.: 11/299,587

(22) Filed: Dec. 12, 2005

(65) Prior Publication Data

US 2007/0130767 A1 Jun. 14, 2007

(51) Int. Cl.
*F02C 1/00* (2006.01)

(52) U.S. Cl. ........................................................ 60/772

(58) Field of Classification Search ................... 60/801, 60/772; 415/124, 122.1, 123
See application file for complete search history.

(56) References Cited

U.S. PATENT DOCUMENTS 5,115,636 A 5/1992 Zeiser
5,813,829 A 9/1998 Mazzotta
6,941,758 B2 * 9/2005 Tiemann ...................... 60/752
2008/0014078 A1 * 1/2008 Suciu et al. ................ 415/180

FOREIGN PATENT DOCUMENTS

EP 0754838 B1 1/1997

OTHER PUBLICATIONS

EPO Search Report; Reference 185792/12064; Application No./Patent No. 06125959.4-2315; Dated Mar. 29, 2007; 5 pgs.

* cited by examiner

*Primary Examiner*—Michael Cuff
*Assistant Examiner*—Andrew Nguyen
(74) *Attorney, Agent, or Firm*—William Scott Andes, Esq.; Armstrong Teasdale LLP

(57) ABSTRACT

A maintenance tool for a gas turbine engine includes a housing coupled to the gas turbine engine, and a drive portion inserted at least partially through the housing. The drive portion is configured to enable the gas turbine engine to be selectively rotated during non-operational periods. Moreover, the maintenance tool is coupled to the gas turbine engine during normal operation.

19 Claims, 4 Drawing Sheets

METHODS AND APPARATUS FOR PERFORMING ENGINE MAINTENANCE

BACKGROUND OF THE INVENTION

This invention relates generally to gas turbine engine inspections and, more particularly, to a method and apparatus utilized to perform gas turbine maintenance.

Aircraft engines typically include a compressor, a combustor, and a turbine that is coupled to the compressor. Moreover, at least one known turbine engine includes an accessory gearbox having an inlet that is coupled to either the compressor or the turbine, such that rotation of gearbox inlet provides the rotational force to drive various accessory devices that may be coupled to the gearbox output.

During operation, turbine engines may suffer performance degradation and fabrication limitations due to an increase, over time, in accumulation of deposits on turbine components. Turbine components suffer an increase in their surface roughness, particularly those located in an engine operating environment, partially because they are exposed to engine combustion gases. A maintenance procedure, for example, a borescope inspection, of these components typically reveals a significant accumulation of dirt and other deposits on surfaces of the engine components.

To borescope a turbine engine, at least one known turbine engine includes a removable plug to faciliate rotating at least a portion of the turbine engine during the maintenance procedure. More specifically, at least one known turbine engine includes a plug that is removed from the accessory gearbox such that an operator can insert a tool through the an opening created by removing the plug and thus gain access to the internal gears within the gearbox. The tool is then utilized to manually rotate the gearbox and thus rotate the compressor and/or the turbine to perform the maintenance procedure.

After the maintenance procedure is completed, the tool is removed and the plug is reinstalled. However, if the plug is not properly replaced following the maintenance procedure the plug may loosen during flight resulting in low oil pressure and an engine In Flight Shut Down (IFSD).

BRIEF SUMMARY OF THE INVENTION

In one aspect, method for assembling a gas turbine engine is provided. The method includes coupling a maintenance tool to the gas turbine engine such that the maintenance tool enables the gas turbine engine to be selectively rotated during non-operational periods and such that the maintenance tool is coupled to the gas turbine engine during normal operation, and selectively operating the maintenance tool to rotate the gas turbine engine.

In another aspect, a maintenance tool for a gas turbine engine is provided. The tool includes a housing coupled to the gas turbine engine, and a drive portion inserted at least partially through the housing. The drive portion is configured to enable the gas turbine engine to be selectively rotated during non-operational periods. Moreover, the maintenance tool is coupled to the gas turbine engine during normal operation.

In a further aspect, a gas turbine engine is provided. The gas turbine engine includes a compressor, a combustor, a turbine coupled to the compressor, a gearbox coupled to at least one of the compressor and the turbine, and a maintenance tool coupled to the gearbox. The maintenance tool includes a housing coupled to the gearbox, and a drive portion inserted at least partially through the housing, the drive portion configured to enable the gas turbine engine to be selectively rotated during non-operational periods, the maintenance tool is coupled to the gas turbine engine during normal operation.

DETAILED DESCRIPTION OF THE INVENTION

Figure 1:
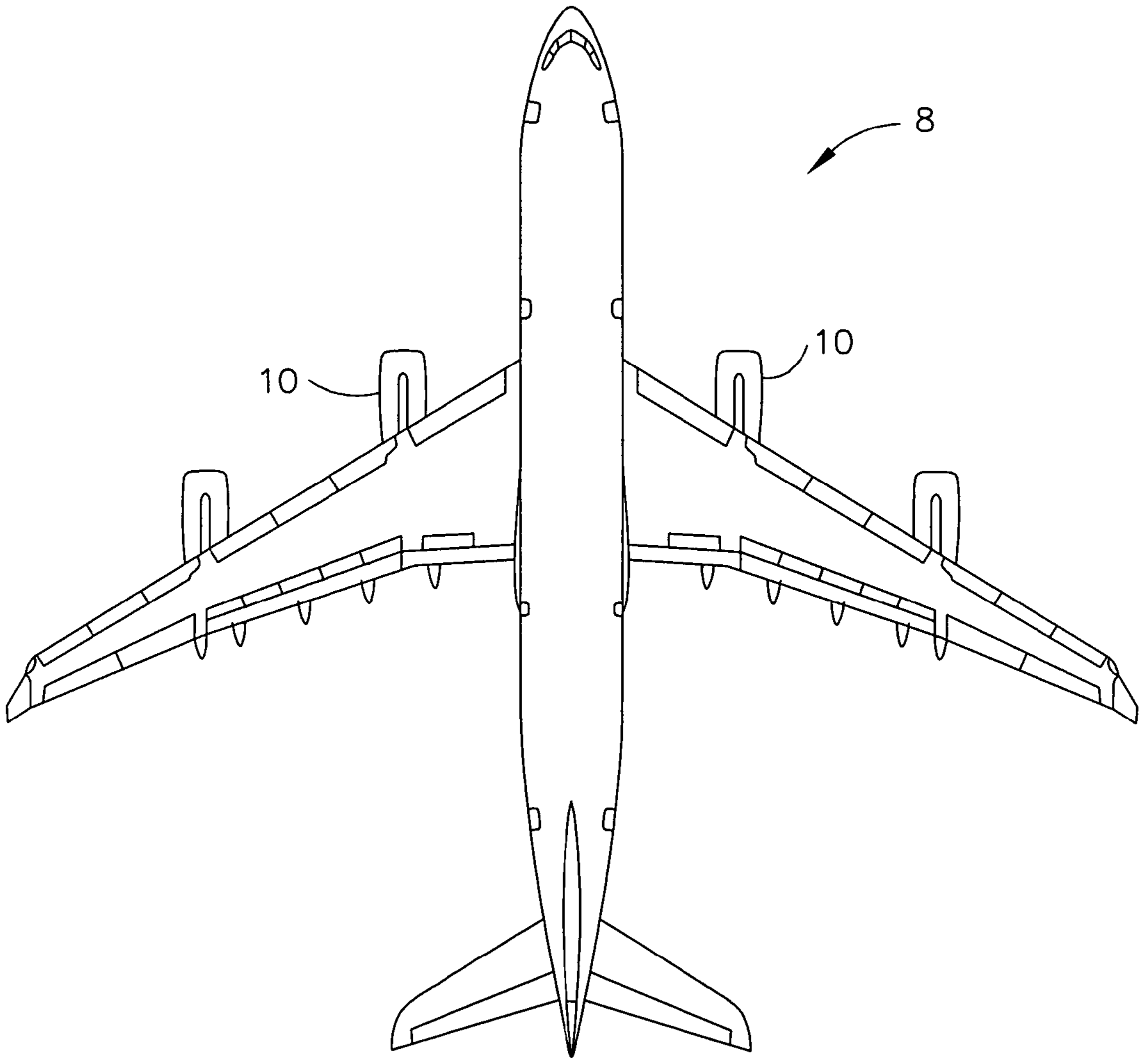
FIG. 1 is an exemplary aircraft including at least one gas turbine engine.

FIG. 1 is a schematic illustration of an exemplary aircraft 8 that includes at least one gas turbine engine 10 and an access panel 11 that is removable to perform maintenance on gas turbine engine 10.

Figure 2:
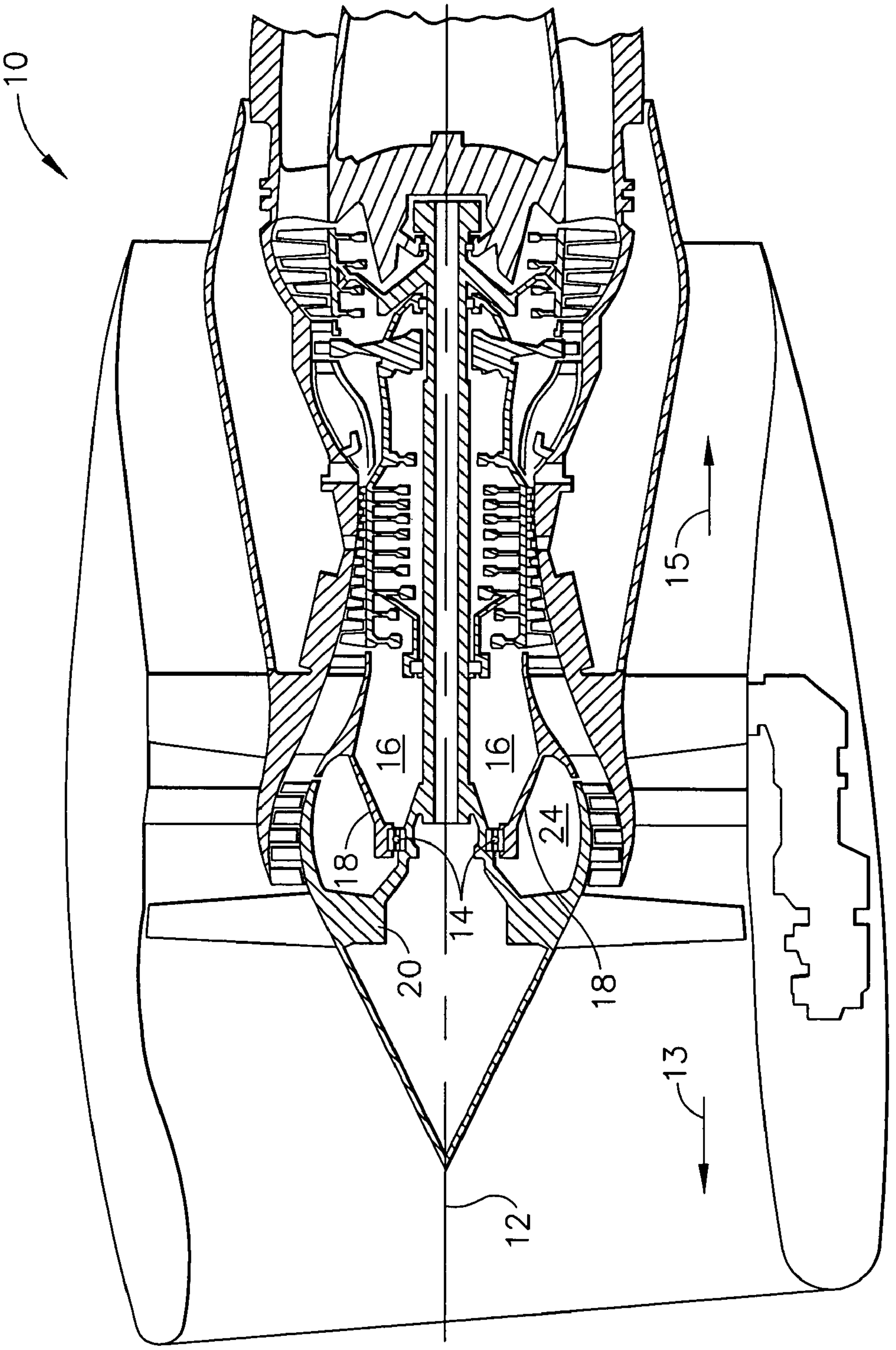
FIG. 2 is a schematic illustration of the gas turbine engine shown in FIG. 1 including an exemplary maintenance tool.

FIG. 2 is an illustration of an exemplary gas turbine engine 10 that may be utilized with the aircraft shown in FIG. 1. Gas turbine engine 10 includes a low pressure compressor 12, a high pressure compressor 14, and a combustor 16. In one embodiment, engine 10 is a CF34 gas turbine engine commercially available from General Electric Company, Cincinnati, Ohio.

In the exemplary embodiment, gas turbine engine 10 also includes a number of accessory devices, such as fuel pumps, lubrication pumps, generators and control units, which are driven by the core engine utilizing an accessory gearbox 20. Moreover, to perform maintenance on the gas turbine engine, the accessory gearbox 20 includes at least one drive pad 22 that is utilized to couple a maintenance tool 100 to the gas turbine engine, such that when the maintenance tool 100 is manually operated, the gas turbine engine rotates to facilitate borescoping the engine, for example.

Figure 3:
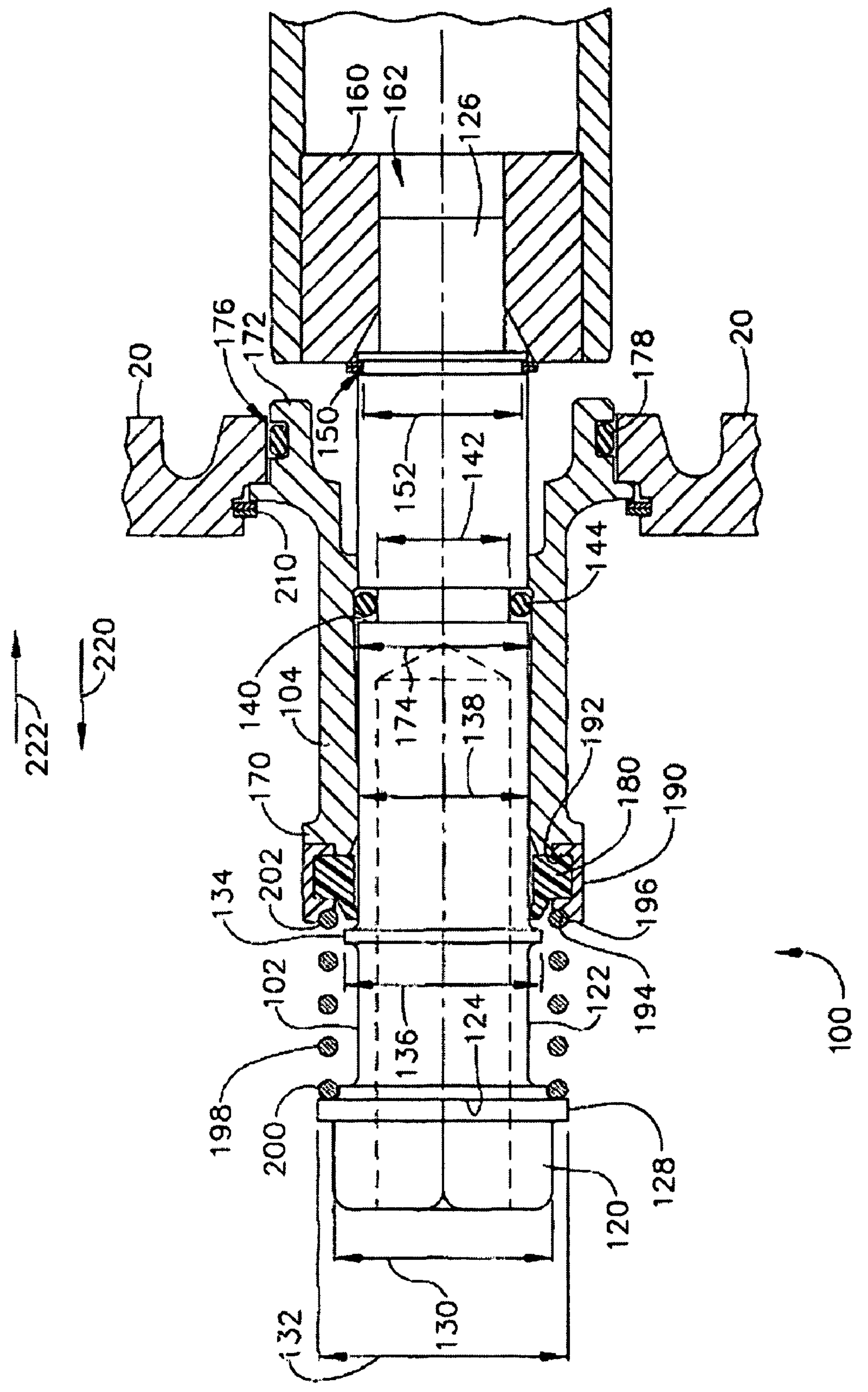
FIG. 3 is a cross-sectional view of the maintenance tool shown in FIG. 2 in a first operational configuration.
Figure 4:
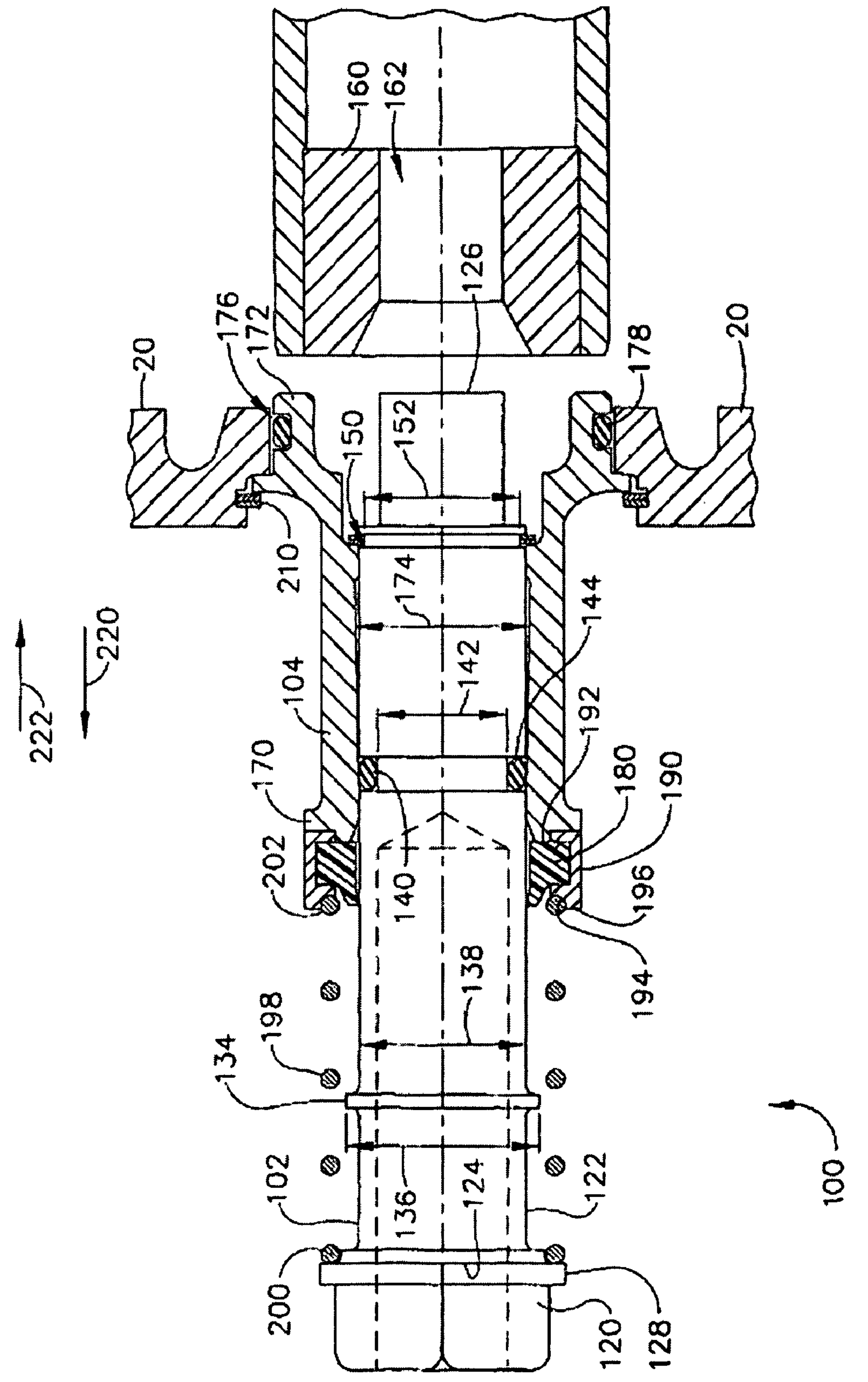
FIG. 4 is a cross-sectional view of the maintenance tool shown in FIG. 2 in a second operational configuration.

FIG. 3 is a cross-sectional view of maintenance tool 100 that may be utilized with the exemplary gas turbine engine shown in FIG. 2 in an engaged position. FIG. 4 is a cross-sectional view of maintenance tool 100 in a disengaged position. Maintenance tool 100 is a cranking plug that is utilized by an operator to manually rotate gas turbine engine 10 during a variety of maintenance procedures.

In the exemplary embodiment, cranking plug assembly 100 includes a substantially cylindrical drive portion 102 and a housing 104 that circumscribes drive portion 102. Drive portion 102 includes has a substantially T-shaped cross-sectional profile and includes a head portion 120 that is utilized to operate drive portion 102, a body portion 122 having a first end 124 that is coupled to head portion 120 and a second end 126 that is sized to be inserted at least partially within gearbox 20. In the exemplary embodiment, head portion 120 is formed unitarily with body portion 122.

More specifically, head portion 120 includes a shoulder 128 that has a first diameter 130 that is greater than a diameter 132 of head portion 120 to facilitate retaining a biasing mechanism that is discussed later herein. Body portion 122 includes a radial projection 134, or travel stop, that extends radially outward and substantially perpendicularly from body portion 122, and has an outer diameter 136 that is greater than a diameter 138 of body portion 122. Radial projection outer diameter 136 defines a substantially circular cross-sectional profile for radial projection 134. Body portion 122 also includes a first channel or groove 140 that is positioned between radial projection 134 and second end 126. Channel 140 has a diameter 142 that is less than body portion diameter 138 and is sized to receive a seal 144 therein. Body portion 122 also includes a second channel or groove 150 that is positioned between first groove 140 and second end 126. In the exemplary embodiment, second groove 150 is positioned proximate to second end 126 and has a diameter 152 that is less than body portion diameter 138 and is sized to receive a retaining device therein.

Body portion 122 also includes second end 126 that is sized to engage a female bushing 160 that is coupled to gearbox 20. More specifically, and in the exemplary embodiment, second end 126 has a square cross-sectional profile and bushing 160 has an opening 162 that is sized to received second end 126.

Housing 104 includes a first end 170 and a second end 172 and has an inner diameter 174 that is sized to circumscribe at least a portion of drive portion 102. Second end 172 also includes a groove 176 or channel that is formed proximate to second end 172 and is sized to receive a seal 178 therein.

Cranking plug assembly 100 also includes a substantially cylindrical wiper 180 that is coupled proximate to housing first end 170 and substantially circumscribes body portion 122. In the exemplary embodiment, wiper 180 is fabricated from a material such as Viton to facilitate inhibiting dirt or similar debris from entering between body portion 122 and housing 104. To facilitate securing wiper 180 to housing portion 104, cranking plug assembly 100 also including a retaining device 190, or wiper housing that is coupled to housing 104 proximate to housing first end 170. More specifically, the wiper housing 190 includes a channel 192 therein that is sized to receive wiper 180 and thus maintain wiper 180 in a substantially fixed position with respect to housing 104. Wiper housing 190 also includes a recess 194 that is formed at a forward end 196 of the wiper housing 190. In the exemplary embodiment, recess 194 and shoulder 128 cooperate to secure a biasing mechanism 198 within cranking plug assembly 100.

To assembly cranking plug assembly 100, seal 144 is inserted into groove 140 in drive portion 102. Moreover, wiper 180 is secured to housing 104 utilizing wiper housing 190. Spring 198 is then positioned around drive portion 102 such that a spring first end 200 is positioned proximate shoulder 128. Drive portion 102 is then at least partially inserted through housing 104 such that seal 144 is in sliding contact between drive portion 102 and an interior surface of housing 104, such that seal 180 is sliding contact between drive portion 102, and such that a biasing mechanism second end 202 is seated within recess 194 formed within wiper housing 190. To secure drive portion 102 within housing 104, retaining device 150 is coupled to drive portion 102. To secure cranking plug assembly 100 to gearbox 20, seal 178 is inserted into groove 176 and the cranking plug assembly is positioned at least partially into an opening in the gearbox 20. To secure cranking plug assembly 100 to gearbox 20, a retaining device 210 is utilized. In one embodiment, the retaining device 200 is a spring clip such as a C-clip for example. Optionally, cranking plug assembly 100 is secured to the gearbox 20 utilizing a plurality of mechanical fasteners.

During operation, a tool is coupled to cranking plug assembly 100 to facilitate operating the cranking plug assembly. More specifically, and in the exemplary embodiment, drive portion head 120 has a substantially hexagonal shape that is sized to receive either as standard socket or wrench. To operate cranking plug assembly 100, a socket or wrench is coupled to drive head portion 120, and force is exerted by an operator on head portion 120 such that drive portion 102 is moved in a first or engaged direction 220. Moving drive portion 102 thus moves drive portion second end into gearbox bushing 162 and thus in engagement with gearbox 20. The operator then rotates drive head portion 120 in either a clockwise or counterclockwise direction to facilitate rotating at least a portion of the gas turbine engine 10. In the exemplary embodiment, radial projection 134, i.e. the stopper, facilitates limiting the distance which drive portion 102 may moved in first direction 220 since stopper 134 will contact seal 180 at a predetermined distance. Moreover, as shown in FIG. 3, because the housing inner diameter 174 is slightly tapered, as drive portion 102 is moved or pushed into gearbox bushing 162 in first direction 220, the pressure on seal 144 is reduced to facilitate reducing the wear on seal 144. However, when the force exerted by the operator on head portion 120 is removed such that drive portion 102 is moved in a second or disengaged direction 222, because the housing inner diameter 174 is slightly tapered, as drive portion 102 is moved or pushed into gearbox bushing 162 in second direction 222, the pressure on seal 144 is increased to facilitate forming a seal between drive portion 102 and housing 104.

To stop rotation of gas turbine engine 10, the force exerted by the operator on head portion 120 is removed such that drive portion 102 is moved in a second or disengaged direction 222. More specifically, biasing mechanism 198, i.e. spring 198 acts against both drive portion should 128 and wiper housing 190 to facilitate moving drive portion 102 in second direction 222 when the force has been removed from the head portion 120. Accordingly, when cranking plug assembly 100 is not being utilized, biasing mechanism 198 facilitates maintaining the drive portion 102 is a disengaged or standby position.

The above described cranking plug assembly includes a housing and a sealed square drive crank shaft. The crank shaft telescopes in its housing to engage the square drive in the gearshaft. When engine cranking is complete, the spring pushes the crank shaft out of engagement. The assembly stays on the engine and faciliates sealing the gearbox during all operational conditions.

Moreover, although the exemplary embodiment, illustrates a cranking plug that is coupled to a gas turbine engine installed on an aircraft, it should be realize that the cranking plug may be utilized with a gas turbine engine that is utilized in any environment, such as a power plant, for example.

The above-described cranking plug assembly is cost-effective and highly reliable. The cranking plug assembly is configured to be installed on a gas turbine engine during all engine operating conditions. Moreover, as explained previously, a known tool is installed through a plug opening in the gas turbine engine. After the inspection is completed the plug is reinstalled. However, if the plug is not properly replaced following the maintenance procedure the plug may loosen during flight resulting in low oil pressure and an engine In Flight Shut Down (IFSD).

Accordingly, the cranking plug assembly described herein is coupled to the gas engine and is configured to remain with the gas turbine engine during all operational conditions. Specifically, the cranking plug assembly described herein remains with the engine while the engine is running and during flight operations. As a result, the cranking plug assembly described herein faciliates reducing the time to perform maintenance, the cranking plug described herein also faciliates eliminating low oil pressure and as a result eliminate In Flight Shut Downs associated with low oil pressure.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

coupling a maintenance tool to the gas turbine engine such that the maintenance tool enables the gas turbine engine to be selectively rotated during non-operational periods and such that the maintenance tool is coupled to the gas turbine engine during normal operation, wherein the maintenance tool includes a drive portion and a housing circumscribing the drive portion wherein the housing comprises an inner surface that is tapered to define a tapered channel and a seal between the housing and the drive portion such that when the maintenance tool is engaged to rotate the gas turbine engine, the pressure on the seal is less than when the tool is disengaged; and rotating the drive portion to facilitate rotating the gas turbine engine, wherein the drive portion is rotatable in a clockwise and a counterclockwise direction.

2. A method in accordance with claim 1, said method further comprising:

coupling the housing to a gas turbine engine gearbox.

3. A method in accordance with claim 2 wherein the maintenance tool comprises a biasing mechanism, said method further comprising:

inserting the drive portion through the biasing mechanism; and depressing the drive portion such the drive portion moves in a first direction and such that at least a portion of the drive portion is engaged with the gearbox and such that the biasing mechanism is at least partially depressed.

4. A method in accordance with claim 3 further comprising releasing the drive portion such that the biasing mechanism moves the drive portion in a second direction.

5. A method in accordance with claim 3 further comprising releasing the drive portion such that the biasing mechanism moves the drive portion to a standby or disengage position.

6. A maintenance tool for a gas turbine engine, said maintenance tool comprising:

a housing coupled to the gas turbine engine; and a drive portion inserted at least partially through said housing, said drive portion configured to enable the gas turbine engine to be selectively rotated during non-operational periods, said drive portion is rotatable in a clockwise and a counterclockwise direction, said maintenance tool is coupled to the gas turbine engine during normal operation;

wherein said housing comprises an inner surface that is tapered to define a tapered channel and a seal between said housing and said drive portion such that when the maintenance tool is engaged to rotate the gas turbine engine, the pressure on the seal is less than when the tool is disengaged.

7. A maintenance tool in accordance with claim 6 wherein said maintenance tool is coupled to a gas turbine engine gearbox.

8. A maintenance tool in accordance with claim 6 further comprising a biasing mechanism circumscribing the drive portion.

9. A maintenance tool in accordance with claim 6 further comprising:

a wiper circumscribing said drive portion; and a wiper housing configured to secure said wiper to said housing.

10. A maintenance tool in accordance with claim 9 wherein said wiper housing comprises a recess and said drive portion comprises a shoulder, said biasing mechanism coupled between said recess and said shoulder.

11. A maintenance tool in accordance with claim 6 wherein said drive portion comprises a hexagonal head sized to receive at least one of a socket and a wrench.

12. A maintenance tool in accordance with claim 6 wherein said drive portion comprises a stopper to facilitate limiting the travel of said drive portion during operation.

13. A maintenance tool in accordance with claim 7 wherein said drive portion comprises a substantially square second end that is sized to engage said gearbox.

14. A gas turbine engine comprising: a compressor; a combustor; a turbine coupled to said compressor; a gearbox coupled to at least one of said compressor and said turbine; and a maintenance tool coupled to said gearbox, said maintenance tool comprising a housing coupled to said gearbox; and a drive portion inserted at least partially through said housing, said drive portion configured to enable the gas turbine engine to be selectively rotated during non-operational periods, said drive portion is rotatable in a clockwise and a counterclockwise direction, said maintenance tool is coupled to the gas turbine engine during normal operation;

wherein said housing comprises an inner surface that is tapered to define a tapered channel and a seal between said housing and said drive portion such that when the maintenance tool is engaged to rotate the gas turbine engine, the pressure on the seal is less than when the tool is disengaged.

15. A gas turbine engine in accordance with claim 14 wherein said maintenance tool further comprises:

a biasing mechanism circumscribing the drive portion;

a wiper circumscribing said drive portion; and a wiper housing configured to secure said wiper to said housing.

16. A gas turbine engine in accordance with claim 15 wherein said wiper housing comprises a recess and said drive portion comprises a shoulder, said biasing mechanism coupled between said recess and said shoulder.

17. A gas turbine engine in accordance with claim 14 wherein said drive portion comprises a hexagonal head sized to receive at least one of a socket and a wrench to rotate said drive portion.

18. A gas turbine engine in accordance with claim 14 wherein said drive portion comprises a stopper to facilitate limiting the travel of said drive portion during operation.

19. A gas turbine engine in accordance with claim 14 wherein said drive portion comprises a substantially square second end that is sized to engage said gearbox.

* * * * *